Patented Sept. 22, 1953

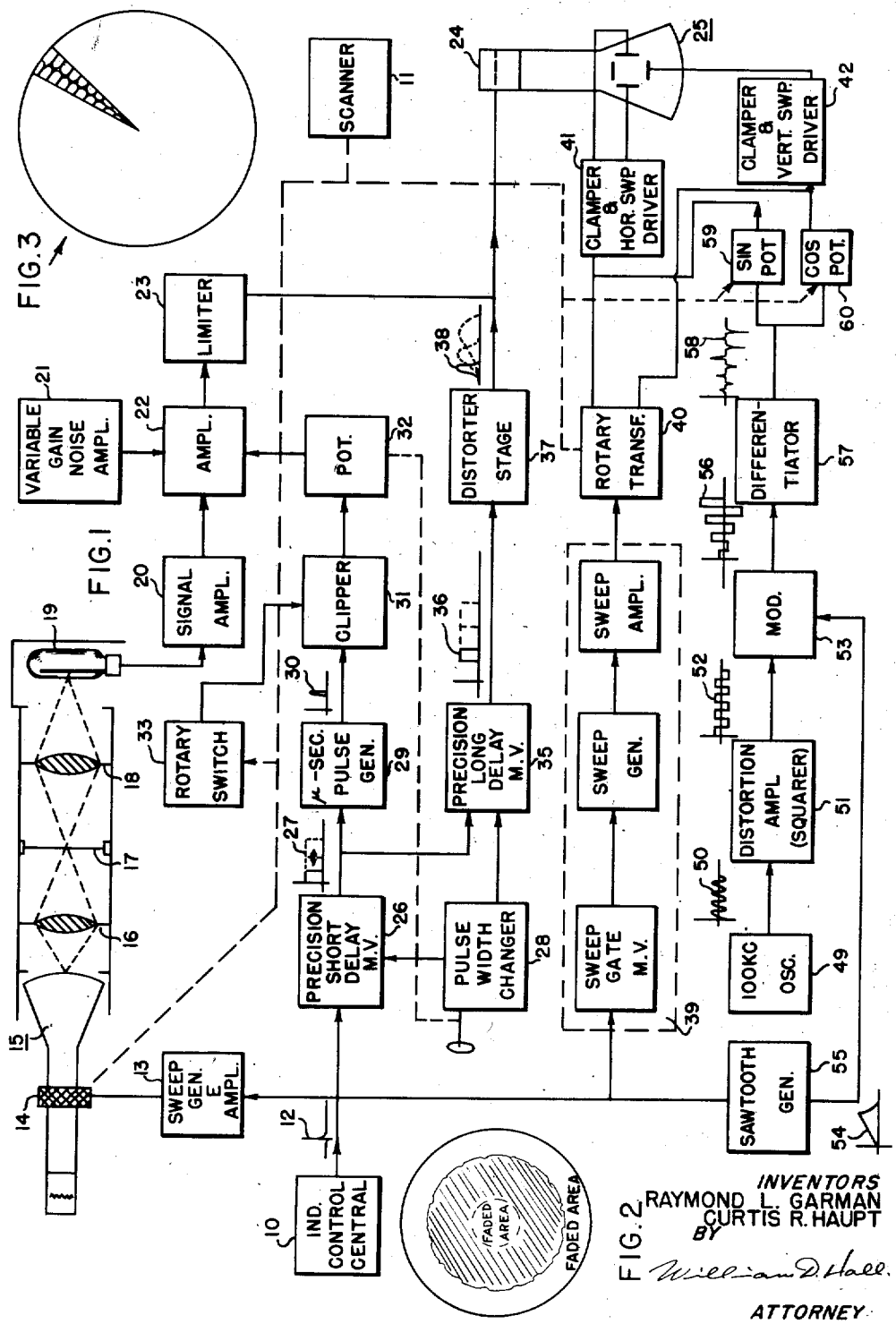

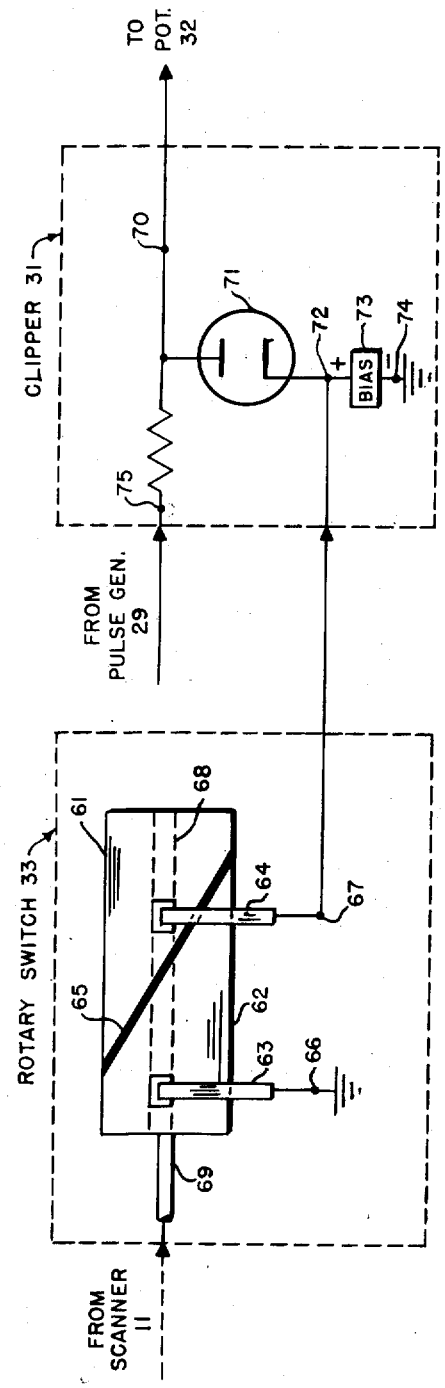

2,652,636

UNITED STATES PATENT OFFICE 2,652,636

RADIO ECHO TRAINING SYSTEM

Raymond L. Garman, Pleasantville, N. Y., and Curtis R. Haupt, San Diego, Calif., assignors, by mesne assignments, to the United States of America as represented by the Secretary of War Application May 24, 1946, Serial No. 672,024

16 Claims. (Cl. 35—10.4)

This invention relates generally to electrical apparatus and particularly to training equipment for airborne P. P. I. systems.

It is often desirable to reproduce, for training and other purposes, areas searched and targets located by a radio echo detection (radar) system. Such a simulated reproduction can greatly reduce the effort and time involved in training operators.

While such simulation is relatively simple for systems using certain types of indicators, simulations for systems using plan position indication (P. P. I.) present more of a problem due to the complexity of returned echo signals. For example, returned echoes as seen in P. P. I. may represent water and various types of land masses which have different characteristic signals. If the radar system is airborne there is also the problem of properly simulating electromagnetic beam coverage in the vertical plane.

It is therefore an object of this invention to generate signals simulating land masses and ground clutter.

Another object is to generate video target signals in proper azimuth with an intensity proportional to range.

Another object is to simulate such signals to portray the effect of electromagnetic beam coverage in a vertical plane.

A further object is to generate signals for simulating the effect of beam width and intensity.

A still further object is to provide means for combining and presenting the above simulated signals in P. P. I. fashion.

Other objects, features, and advantage of the invention will suggest themselves to those skilled in the art and will be apparent from the following description of the invention taken in connection with the accompanying drawings in which:

Fig. 1 is a block diagram illustrating a circuit embodying the invention;

Fig. 2 is a view of the P. P. I. screen indicating faded areas due to beam coverage in the vertical plane;

Fig. 3 is a view of the P. P. I. screen indicating beam width and intensity with respect to range; and Fig. 4 shows a schematic circuit diagram more specifically illustrating certain components of Fig. 1.

The apparatus here described includes a transmitting cathode ray tube which, together with associated apparatus and a map made upon positive film, functions to produce upon a receiving cathode ray tube indicator a simulation of land and water areas as they would normally be observed upon an actual airborne radar indicator. Further circuits in the apparatus achieve simulation of the variation of echo signal dimensions and intensity as seen upon an actual radar indicator, and of certain interference known in the art as ground clutter which tends to obscure details on the screen.

Referring now to Fig. 1, the indicator control central (synchronizer) 10 and scanner 11 provide electrical and mechanical synchronizing means, respectively, for the trainer system. Synchronizer 10 may be a master oscillator such as that shown on page 142 of Radar System Fundamentals, NAVSHIPS 900,017, published by the Navy Department in 1944. A sharpened trigger pulse 12 from synchronizer 10 actuates a sweep generator 13 which, in conjunction with a rotating yoke 14, driven by scanner 11, provides a transmitting cathode ray tube (C. R. T.) 15 with plan position indication (P. P. I.) scan. The visible trace present upon the screen of transmitting C. R. T. 15 is focused by a lens 16 on a positive film 17 of a desired map, permitting light to pass more readily through those areas from which simulated signal reflections are desired than from other areas. The light passing through film 17 is in turn focused by a lens 18 on a stabilized photomultiplier tube 19 which generates video signals according to the variation in intensity of the light received. This simulated land mass signal is amplified in an amplifier 20, and combined with noise signals from a variable gain noise amplifier 21 in an amplifier 22. A suitable noise generator and amplifier is shown in the patent to Ring et al., No. 2,165,509, issued on July 11, 1939. Another suitable noise generator is shown in Massachusetts Institute of Technology Radiation Laboratory Report No. 443, dated September 17, 1943. Target echo signals from a target simulating circuit later to be described, are also combined with the land mass and noise signals in amplifier 22, and then the entire combined signal is passed through a limiter stage 23 to intensity modulate the control grid 24 of a receiving C. R. T. 25. A suitable limiter stage 23 is shown on page 159 of Radar Electronics Fundamentals, NAVSHIPS 900,016, published by the Navy Department in 1944. The noise signal from variable gain amplifier 21 is for the purpose of simulating ground clutter of the area scanned, and may be adjusted to simulate varying transmitting and receiving conditions.

The target echo simulating circuit comprises a positive grid short delay multivibrator 26 actuated by pulse 12 from synchronizer 10. Multivibrator 26 produces a positive gate output pulse 27 having its trailing edge accurately controllable in time phase by a pulse width changer 28. This pulse width variation represents variation in range which may be manually introduced. The trailing edge of the gating pulse 27 trips a microsecond pulse generator 29 producing a video target echo pulse 30 which is passed through a clipper stage 31 and a potentiometer 32 to be combined with land mass and ground clutter signals in amplifier 22. Clipper stage 31 is shown in Fig. 4, and consists of a diode 71 having a source of bias 73 in its cathode circuit. Bias source 73 is connected at terminal 72 to the cathode of diode 71 and is also connected through terminal 74 to ground, thus placing a positive bias upon the cathode of diode 71. The output from pulse generator 29 is fed into terminal 75 and then through a resistor to the anode of diode 71. The clipped pulses from pulse generator 29 are taken out at terminal 70 of clipper 31 and are fed into potentiometer 32. To cause this pulse to trace only a short arc on C. R. T. 25, the clipper stage 31 is normally biased at cut-off and a rotary switch 33, having adjustable contacts and driven by scanner 11, intermittently shorts out the bias to cause target indication at an azimuth determined by settings of the adjustable contacts. A suitable rotary switch having adjustable contacts is shown in the patent to Barr, No. 1,793,989, issued on February 24, 1931. This switch is illustrated in Fig. 4 and comprises a rotary switch 33 having two conductive drum halves 61 and 62, separated by an insulator bar 65. Adjustable contacts 63 and 64 are adapted to slide within groove 68 on the surface of said drum. A shaft 69 is mechanically coupled to the shaft being driven by scanner 11, and the shaft 69 causes drum 61, 62 to be driven in synchronism with the scanning of cathode ray tubes 15 and 25. Adjustable contact 63 is grounded at a terminal 66, and adjustable contact 64 is connected to terminal 67 which is in turn connected to terminal 72 in the cathode circuit of diode 71 in the clipper stage 31. As rotary switch 33 is driven by scanner 11, it will be apparent that at a given angle of rotation of drum 61, 62 both adjustable contacts 63 and 64 will be upon the same side of insulator 65, and for that interval of time bias source 73 within clipper stage 31 will be short-circuited by the rotary switch 33, the short circuit being through terminal 72, through terminal 67, through contact 64, through drum-half 62, through contact 63, and through terminal 66 to ground. Since bias source 73 is grounded at terminal 74 it will be seen that it is shorted out periodically by rotary switch 33. By moving contact 64 closer or further from contact 63, the angle of rotation of drum 61, 62 necessary before bias source 73 is short-circuited may be increased or decreased. During the interval when bias source 73 is short-circuited, pulses from pulse generator 29 are passed by diode 71, and placed upon potentiometer 32. The potentiometer 32 is mechanically linked to the pulse width changer 28 in a manner to enable automatic decrease of signal strength with range.

A precision long delay multi-vibrator 35 is also triggered by the trailing edge of gate pulse 27 to produce another gate pulse 36 also controllable in time phase by pulse width changer 28, which is passed through a distorter stage 37. The distorter stage may consist of a cathode follower properly biased to produce a distorted signal 38. From the shape of this signal it is seen that when applied to the intensity control grid 24 of receiving C. R. T. 25, it will produce an uneven illumination on the screen such as illustrated in Fig. 2. This uneven illumination simulates electromagnetic beam coverage in the vertical plane. The variation in pulse width is representative of the variations in the angle that the beam makes with the vertical.

Receiving C. R. T. 25 is provided with P. P. I. scan by conventional sweep generating means indicated in the block 39 including, as shown, a sweep gate multivibrator, sweep generator, and a sweep amplifier, actuated by synchronizer 10 and coupled to the horizontal and vertical deflection plates through a rotary transformer 40, mechanically connected to scanner 11, and conventional clamper and driver stages 41 and 42. Suitable transformer and clamper stages are shown connected together and are described on pages 282, 283 of the aforesaid Radar System Fundamentals. The electrical and mechanical connections to synchronizer 10 and scanner 11, respectively, provide a P. P. I. scan synchronized with that of transmitting C. R. T. 15.

In many radar systems, objects which are of the same size cause an indication to appear on the indicator screen smaller in azimuth angle with increasing distance. In attempting to simulate this effect it is desired to produce a beam on the face of cathode ray tube 25 which will dwell for a longer period of time at its azimuthal center than at its azimuthal extremities, and will dwell for a longer period of time near the center than at the outer portions of the tube face, since at the azimuthal and tube face extremities less energy is returned from the target. Referring now to Fig. 3, this effect is simulated by modifying the type of sweep from radial straight-line sweep to one having the appearance of linearly modulated oscillations centered about an imaginary straight line but increasing substantially linearly in amplitude with increasing range. As shown in Fig. 1, in order to obtain the desired effect, an oscillator 49, operating for example at 100 kilocycles, produces a sine wave output 50. This signal, passed through a distortion amplifier 51, arrives as a square wave 52 at a modulator 53, where it is modulated by a sawtooth wave 54 from a sawtooth generator 55. The sawtooth generator 55 is triggered by synchronizer 10. The output of modulator 53 is a linearly increasing square wave 56 which is further modified in a differentiator 57 to produce differentiated square wave pulses 58. The purpose of pulses 58 is to cause the electron beam of the C. R. T. to sweep at a slower rate near the imaginary straight line sweep, when near the center of the P. P. I. tube, thereby simulating the effect of lesser intensity returns at the sides of the transmitted energy beam. However, near the tube periphery, the beam moves so rapidly at a distance a similar arc from the center line, that only when the echo occurs near the center line does the screen become illuminated. The output of differentiator 57 is modulated into sine and cosine envelopes by the sine and cosine potentiometers 59 and 60 respectively, which are driven by scanner 11, and thence applied to the horizontal and vertical deflection circuits of receiving C. R. T. 25.

It will be seen that the trainer circuit herein set forth provides for simulating realistic operation of a radar system.

While there has been described what is at present considered to be the preferred embodiment of this invention, it will be obvious to those skilled in the art that various changes and modifications may be made therein without departing from the scope and spirit of the invention as set forth in the appended claims.

What is claimed is:

1. A radio echo training system comprising cathode ray tube indicator means, means for simulating ground echo signals and comprising a film map of the terrain that it is desired to depict upon the face of said indicator means and means for scanning said map so as to produce signals to be impressed upon the face of said indicator means, means for simulating target echo signals, and means for combining both said signals upon the face of said indicator means.

2. The system of claim 1, including means for synchronizing the operation of said scanning means with that of said indicator and target echo simulating means.

3. The system of claim 2, wherein said scanning means includes cathode ray tube indicator means having its face facing one side of said film, and photoelectric cell means facing the other side of said film, said synchronizing means comprising a pulse generator for activating said target echo simulating means as well as the sweep circuits of both said indicator means.

4. A radio echo training system comprising: means for scanning a terrain map so as to produce simulated ground echo signals, said scanning means including first plan position indicator means; second plan position indicator means; means for generating simulated, variably delayed target echo signals; means for synchronizing the sweep circuits of said first and second indicator means together with the means for generating target echo signals; and means for combining said simulated target and ground echo signals upon the face of said second indicator means.

5. The system of claim 4, further including means for generating noise signals, and means for impressing said noise signals upon the face of said second indicator means.

6. The system of claim 5, further including means coupled to said means for generating target echo signals and to said means for generating noise signals for varying the signal-to-noise ratio in accordance with the range of said target echo signals so as to decrease target echo signal strength with increases in range.

7. A radio echo training system comprising: means for scanning a terrain map so as to produce simulated ground echo signals, said scanning means including first plan position indicator means; second plan position indicator means; means for synchronizing the sweep circuits of said first and second indicator means; means for generating simulated target echo signals including multivibrator means adapted to be activated by said synchronizing means, means for varying the duration of the square wave output of said multivibrator means, and pulse producing means adapted to be triggered by the trailing edge of said square wave output; and means for combining said simulated target and ground echo signals upon the face of said second indicator means.

8. The system of claim 7, further including means for generating noise signals, and means for placing said noise signals upon the face of said second indicator means.

9. The system of claim 8, further including means coupled between said means for generating target echo signals and said means for generating noise signals for varying the signal-to-noise ratio in accordance with the range of said target echo signals, so as to decrease target echo signal strength with increases in range.

10. The system of claim 7, further including means for unevenly illuminating the face of said second indicator means, said illuminating means comprising multivibrator means adapted to produce an output square wave whose duration is also varied by said varying means, said last-named multivibrator means being triggered by the output of said first-named multivibrator means.

11. The system of claim 7, further including square wave oscillator means, means for coupling the output of said square wave oscillator means to the output of the sweep circuit of said second indicator means to produce a combined output waveform, and means for differentiating said combined output waveform and then applying it to the face of said second indicator means in order that said simulated target echoes may appear more brightly near the azimuthal center and beginning than near the azimuthal extremities and end of the sweep.

12. The system of claim 7, wherein said synchronizing means also includes scanner means adapted to rotate the sweeps appearing upon the faces of said first and second indicator means, and wherein said system further includes switch means adapted to be rotated by said scanner means, said switch means being coupled to said pulse producing means and serving to allow the pulse output thereof to appear upon the face of said second indicator means for only a small azimuth angle.

13. The system of claim 12, further including square wave oscillator means, means for coupling the output of said square wave oscillator means to the output of the sweep circuit of said second indicator means to produce a combined output waveform, and means for differentiating said combined output waveform and then applying it to the face of said second indicator means in order that said simulated target echoes may appear more brightly near the azimuthal center and beginning than near the azimuthal extremities and end of the sweep.

14. The system of claim 13, further including means for generating noise signals, and means for placing said noise signals upon the face of said second indicator means.

15. The system of claim 14, further including means adapted to be varied by said means for varying and coupled between the output of said first multivibrator means and said second indicator means for decreasing the amplitude of the output of said first multivibrator means with increases in target range in order to vary the signal-to-noise ratio.

16. The system of claim 15, further including means for unevenly illuminating the face of said second indicator means, said illuminating means comprising multivibrator means adapted to produce an output square wave whose duration is also varied by said varying means, said last-named multivibrator means being triggered by said first-named multivibrator means, and means coupled to the output of said last-named multivibrator means, for distorting the output thereof before its application to said second indicator means.

RAYMOND L. GARMAN.
CURTIS R. HAUPT.

References Cited in the file of this patent

UNITED STATES PATENTS

| Number | Name | Date |
|---|---|---|
| 2,199,066 | Bernstein | Apr. 30, 1940 |
| 2,215,365 | Vestergren | Sept. 17, 1940 |
| 2,399,661 | Bowie | May 7, 1946 |
| 2,405,591 | Mason | Aug. 13, 1946 |
| 2,406,751 | Emerson | Sept. 3, 1946 |
| 2,415,831 | Marshall | Feb. 18, 1947 |
| 2,416,088 | Deerhake | Feb. 18, 1947 |
| 2,433,681 | Blumlein | Dec. 30, 1947 |
| 2,539,511 | Hansen | Jan. 30, 1951 |